(12) United States Patent
Salah et al.

(10) Patent No.: US 11,925,519 B2
(45) Date of Patent: Mar. 12, 2024

(54) METHOD FOR EVALUATING A DENTAL SITUATION WITH THE AID OF A DEFORMED DENTAL ARCH MODEL

(71) Applicant: DENTAL MONITORING, Paris (FR)

(72) Inventors: Philippe Salah, Paris (FR); Thomas Pellissard, Paris (FR); Laurent Debraux, Paris (FR); Louis-Charles Roisin, Paris (FR)

(73) Assignee: DENTAL MONITORING, Paris (FR)

( * ) Notice: Subject to any disclaimer, the term of this patent is extended or adjusted under 35 U.S.C. 154(b) by 664 days.

(21) Appl. No.: 16/921,607

(22) Filed: Jul. 6, 2020

(65) Prior Publication Data
US 2021/0007834 A1  Jan. 14, 2021

(30) Foreign Application Priority Data

Jul. 8, 2019  (FR) ...................................... 1907631

(51) Int. Cl.
*A61C 13/00* (2006.01)
*G06T 7/00* (2017.01)
*G06T 19/20* (2011.01)

(52) U.S. Cl.
CPC ...... *A61C 13/0004* (2013.01); *A61C 13/0006* (2013.01); *G06T 7/0012* (2013.01);
(Continued)

(58) Field of Classification Search
CPC ......... A61C 7/002; A61C 7/08; A61C 9/0046; G06T 19/20; G06T 2207/30036;
(Continued)

(56) References Cited

U.S. PATENT DOCUMENTS

2016/0175068 A1  6/2016  Cai et al.
2018/0303581 A1* 10/2018  Martz ....................... A61C 7/08
(Continued)

FOREIGN PATENT DOCUMENTS

CN   106204688 A  * 12/2016 ........... G06T 11/203
CN   107260351 A    10/2017
WO   WO-2017182648 A1 * 10/2017 ........... A61B 5/7275

OTHER PUBLICATIONS

French Search Report corresponding to French Application No. FR1907631 dated May 19, 2020, 9 pages.

*Primary Examiner* — Ming Wu
(74) *Attorney, Agent, or Firm* — Ronald M. Kachmarik; Cooper Legal Group LLC

(57) ABSTRACT

Method for evaluating a dental situation of a patient. The method having the following successive steps: 1) generating an initial model of at least one dental arch of the patient, preferably by means of a scanner; 2) splitting the initial model in order to define a tooth model for at least some of the teeth represented on the initial model and thereby to obtain a split model; 3) determining an initial support curve of the tooth models in the split model; 4) fixing each tooth model virtually on the initial support curve, preferably by computer; 5) modifying the split model by deformation of the initial support curve according to a deformed support curve, so as to obtain a first deformed model, in which the tooth models are aligned according to the deformed support curve; 6) presenting the first deformed model.

19 Claims, 5 Drawing Sheets

1) generating an initial model of at least one dental arch of the patient 2) splitting the initial model into tooth models 3) determining an initial support curve of the tooth models in the split model 4) fixing each tooth model virtually on the initial support curve 5) modifying the split model by deformation of the initial support curve according to a deformed support curve 6) presenting the first deformed model

(52) U.S. Cl.
CPC .... *G06T 19/20* (2013.01); *G06T 2207/20081* (2013.01); *G06T 2207/20084* (2013.01); *G06T 2207/30036* (2013.01); *G06T 2210/41* (2013.01); *G06T 2219/2004* (2013.01); *G06T 2219/2008* (2013.01); *G06T 2219/2012* (2013.01); *G06T 2219/2021* (2013.01)

(58) Field of Classification Search
CPC ....... G06T 2200/08; G06T 2207/10028; G06T 7/0012; G06T 17/00; G06T 17/205; G06T 2200/00; G06T 2200/04; G06T 2207/20081; G06T 2207/20084; G06T 2210/41; G06T 2200/24; G06T 2207/10016; G06T 2207/20021; G06T 2210/56; G06T 2219/2004; G06T 7/344; G06T 7/50; G06T 7/70

See application file for complete search history.

(56) References Cited

U.S. PATENT DOCUMENTS

| | | |
|---|---|---|
| 2019/0029784 A1 | 1/2019 | Moalem et al. |
| 2019/0125493 A1* | 5/2019 | Salah ..................... A61C 7/002 |
| 2019/0259219 A1* | 8/2019 | Lancelle ................. G06T 19/20 |

* cited by examiner

[Fig 1]
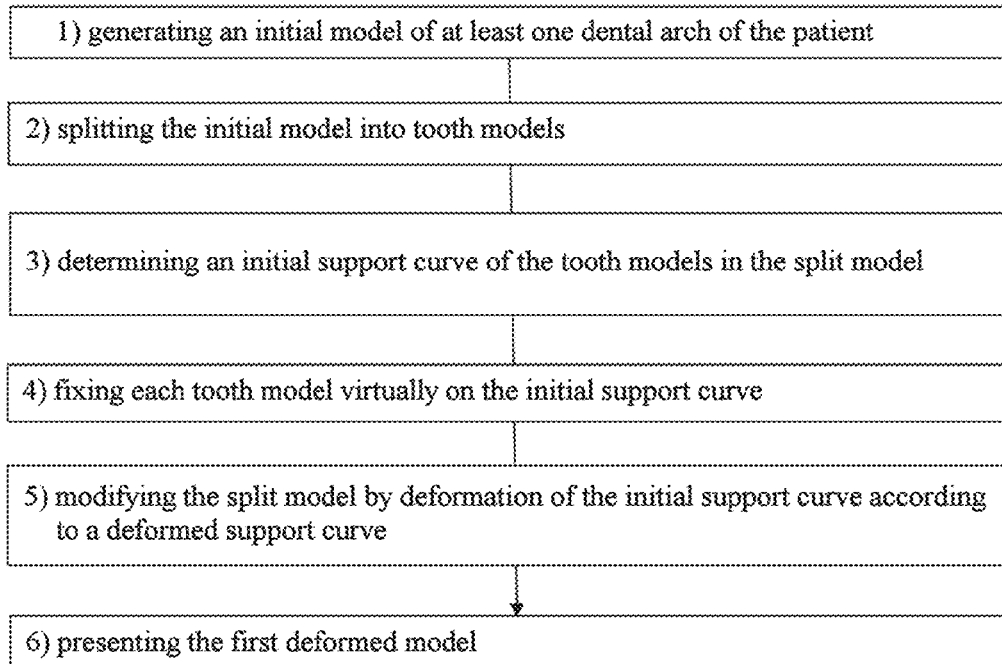
[Fig 2]
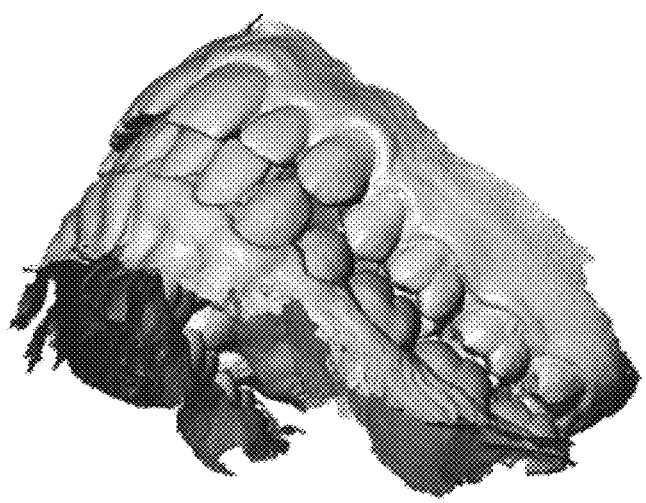

[Fig 3]
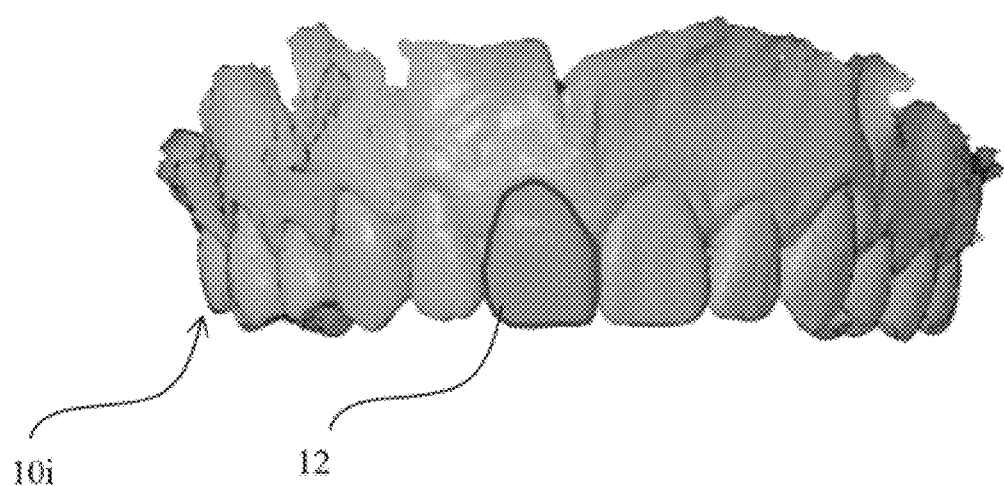
[Fig 4]
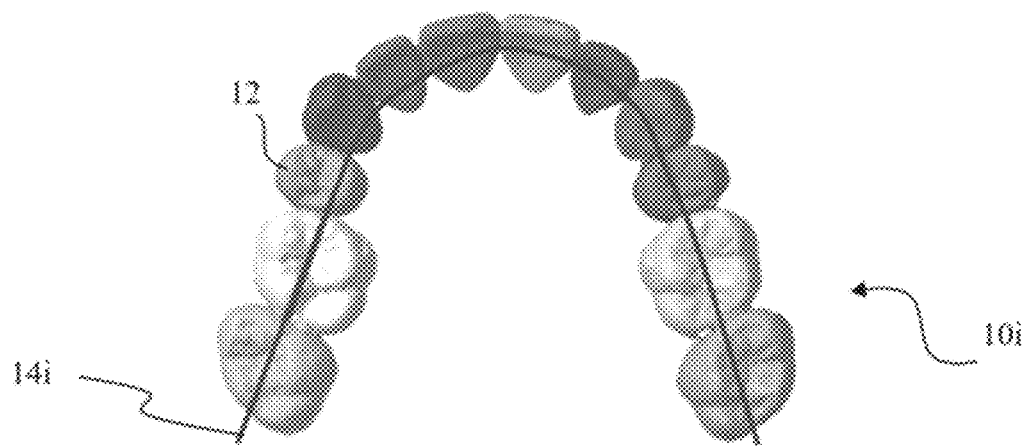

[Fig 5]
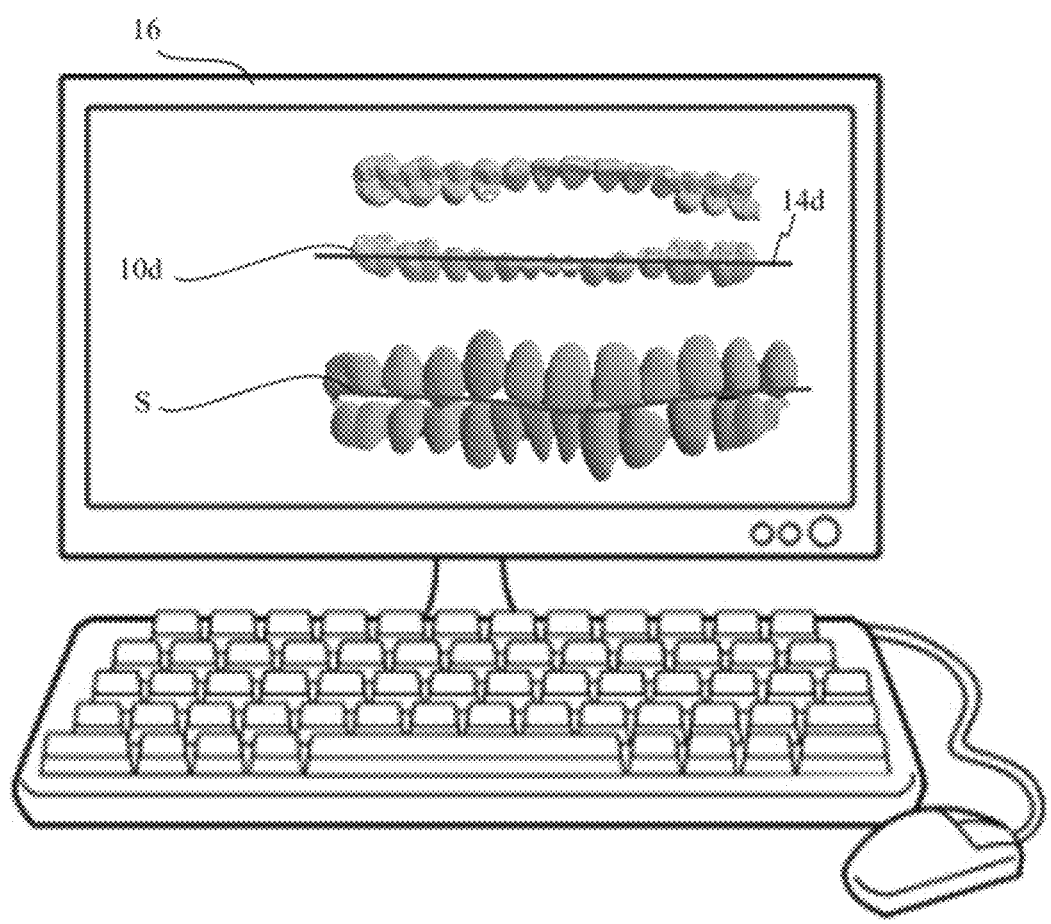

[Fig 6]
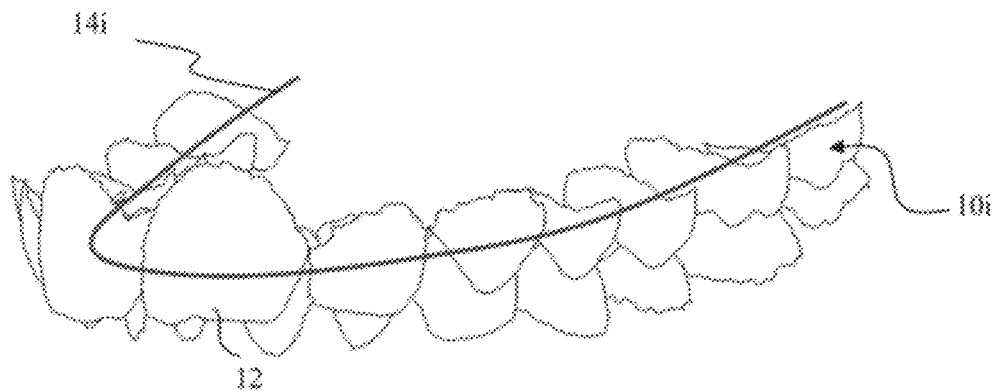
[Fig 7]
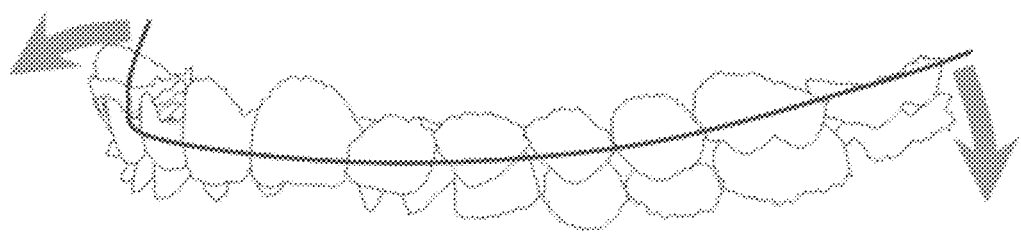
[Fig 8]
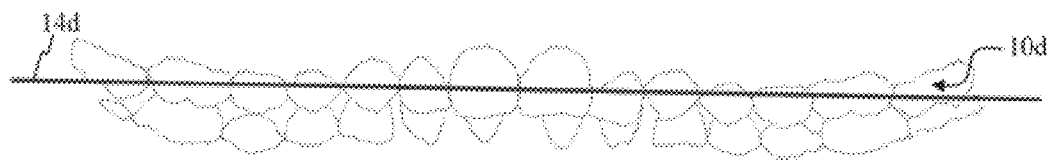

[Fig 9]
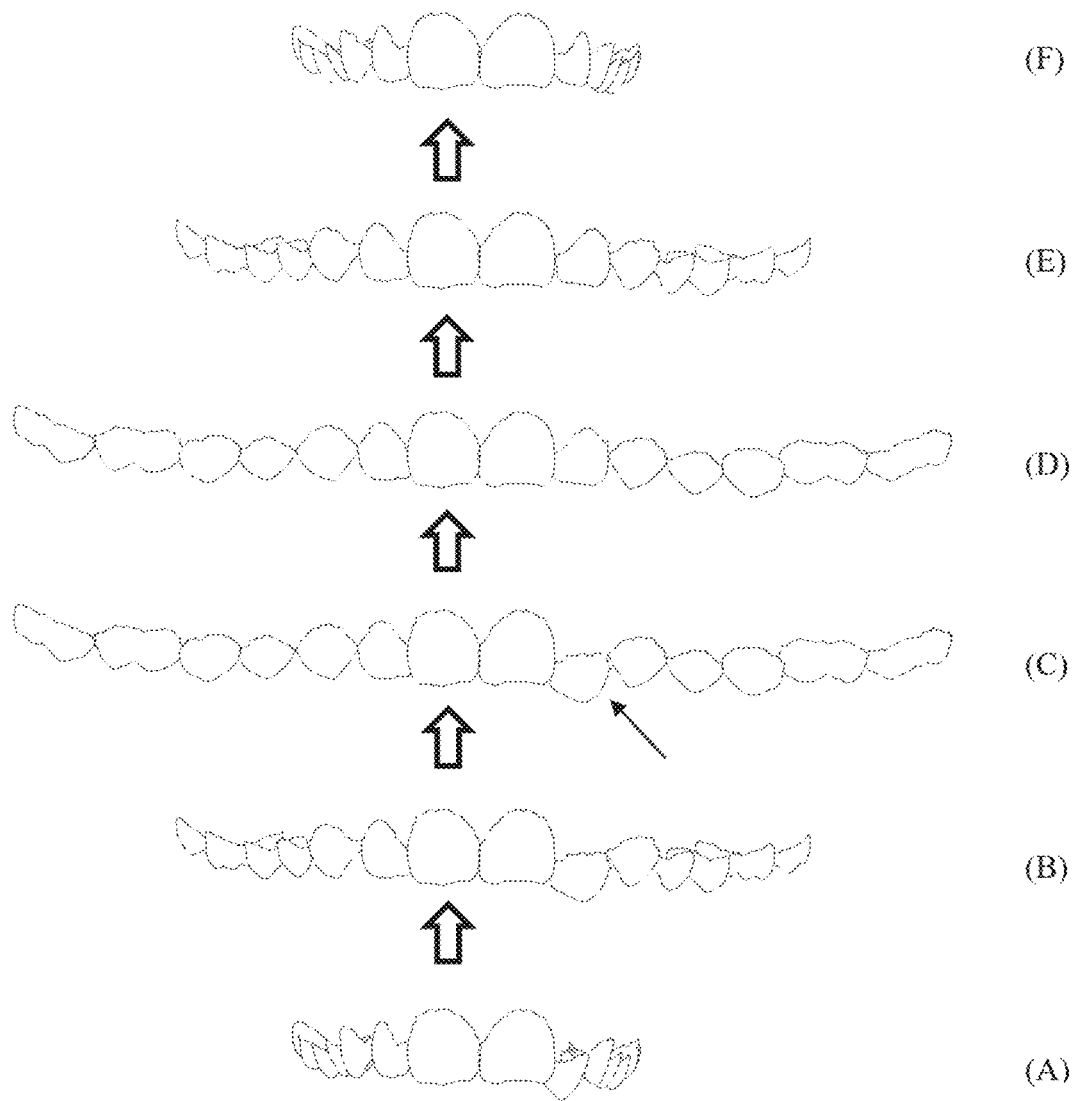

METHOD FOR EVALUATING A DENTAL SITUATION WITH THE AID OF A DEFORMED DENTAL ARCH MODEL

TECHNICAL FIELD

The present invention relates to a method for evaluating a dental situation, in particular for evaluating an overbite.

PRIOR ART

A horizontal overbite, that is to say an anterior-posterior overbite (or overjet), is measured by the distance in millimeters, and in the occlusal plane, between the central maxillary incisors and the central mandibular incisors. When this distance is excessive, and traditionally when the upper incisors of a patient protrude abnormally, it may be necessary, for therapeutic or esthetic reasons, to correct this situation.

The evaluation of the horizontal overbite, by the orthodontist, determines the orthodontic treatment and the effectiveness of the latter.

There is an ongoing need to improve this evaluation.

An object of the present invention is to respond to this need.

SUMMARY OF THE INVENTION

According to the invention, this object is achieved by means of a method for evaluating a dental situation of a patient, having the following successive steps:
1) generating a model of at least one dental arch of the patient, called the initial model, preferably by means of a scanner,
2) splitting the initial model in order to define unit models for each of at least some of the teeth, preferably for each tooth represented in the initial model, or tooth models, so as to obtain a split model;
3) defining, preferably by computer, a support curve in the split model, preferably an alignment curve of the tooth models, or initial support curve;
4) fixing at least one part, preferably each tooth model, virtually to the initial support curve;
5) modifying the split model by deformation of the initial support curve until a deformed support curve is obtained, preferably rectilinear, so as to obtain a first deformed model.

As will be seen in more detail in the description below, a method according to the invention permits generation of a model that is modified in order to facilitate analysis and/or the taking of measurements. Advantageously, this modified model can be designed to permit the simultaneous visualization of a large number of teeth, in particular a number of teeth greater than that permitted by a view of the initial model or a photo of the arch.

The speed and precision of the analysis are thereby improved.

A method according to the invention can also have one or more of the following optional features:
the method has a step (6), subsequent to step 5), in which the first deformed model is presented to an operator, preferably to a dental healthcare professional, preferably on a computer screen, and/or
one or more measurements of size or appearance, in particular of color, are taken on the first deformed model, and/or
the shape and/or the position of one or more tooth models of the first deformed model are modified;
in step 2), the initial model is split in such a way as to define an upper arch model and a lower arch model, and, in step 6), the position of the upper arch model with respect to the lower arch model is modified;
the method has a step 7), subsequent to step 5) or to step 6), in which
A) the first deformed model is modified by deformation of the deformed support curve until a final support curve is obtained, preferably identical to the initial support curve, so as to obtain a second deformed model; then
B) an orthodontic treatment is determined on the basis of the second deformed model and/or an orthodontic appliance is designed and preferably manufactured, preferably an orthodontic aligner;
in step 5), the initial support curve, in whole or in part, is non-deformable in one or more directions, preferably retains its length, and/or
has a lengthening or shortening capacity that is uniform and/or limited upon said deformation;
the tooth models are configured to freely permit the deformation in step 5) and/or in step 7), that is to say not to oppose said deformation;
the tooth models are configured to interpenetrate or deform when, during the deformation of the initial support curve, they come into contact with an adjacent tooth model, so as not to oppose the deformation in step 5) and/or step 7);
before step 5), the initial model is colored, at least partially, using a color scanner in step 1) or by a coloring method that has the following successive steps:
a) identification of a view of the initial model having a maximum concordance with a photo of the arch;
b) identification for a voxel, preferably for each voxel, represented on said view, of a pixel of said photo that represents the same point of the dental arch as the voxel;
c) allocation to said voxel of the colors of said pixel;
the photo is replaced by a hyper-realistic view obtained by means of a neural network, preferably by the following successive steps:
a') creation of a learning base composed of over 1,000 records, each record having:
a photo representing a "historical" dental arch, and
a "historical" view of a three-dimensional digital model of the historical dental arch, the "historical" view representing the historical dental arch as the photo, that is to say so as to be superimposable in register with the photo;
b') training a neural network by means of the learning base, such that it learns to color, in a hyper-realistic manner, a view of a model;
c') submission of said view of the initial model to the trained neural network, such that the latter colors it in a hyper-realistic manner,
the deformed support curve is rectilinear;
in step 3), the initial support curve is determined by means of a calculation algorithm, preferably as a function of dimensional characteristics of the arch;
in step 3), the initial support curve is determined in such a way as to cross at least two tooth models, preferably all the tooth models of the dental arch;
in step 3), several initial support curves are determined, in step 4) said initial support curves are fixed virtually to the same tooth models, to different tooth models, or in part to the same tooth models and in part to different tooth models, and, in step 5), the initial support curves are deformed without modifying their respective lengths.

The invention also relates to the use of a method according to the invention for determining an orthodontic treatment and/or designing an orthodontic appliance, and/or for finding symptoms detectable by analysis of dimensions of the arch, or finding symptoms detectable by analysis of the color of the surface of the arch. It relates in particular to the use of a method according to the invention, for therapeutic or non-therapeutic purposes, for evaluating the efficacy of a tooth whitening treatment, identifying a dental situation of molar incisor hypomineralization and/or evaluating a horizontal overbite and/or determining a class of occlusion and/or evaluating a right-left asymmetry of an arch and/or a difference in shape between the upper and lower arches and/or measuring or comparing the orientation of teeth and/or the distance between teeth and/or the overlapping of teeth.

The invention thus also relates to:
  a computer program comprising program code instructions for the at least partial execution of one or more of the steps of a method according to the invention, when said program is executed by a computer,
  a data medium on which such a program is recorded, for example a CD-ROM.

Definitions

A "patient" is a person for whom a method according to the invention is carried out, whether or not this person is following an orthodontic treatment.

A "dental healthcare professional" may be in particular an orthodontist or as dentist.

A "dental situation" defines a set of characteristics relating to a dental arch of a patient at a given time, for example the position of the teeth, their shape, the position of an orthodontic appliance, etc., at this time.

A "model" is understood as a three-dimensional digital representation. A model is composed of a set of voxels. An "arch model" is a model representing at least part of a dental arch, preferably at least 2 teeth, preferably at least 3 teeth, preferably at least 4 teeth, preferably all the teeth of an arch. A "tooth model" is a model representing a single tooth.

The "splitting" of a model of an arch into "tooth models" is an operation by which it is possible for the representations of the teeth (tooth models) to be delimited and rendered autonomous in the model of the arch. A tooth model is "autonomous" when it is not joined to the rest of the model of the arch, such that it can be oriented, for example turned, independently of the rest of the arch model.

A "support curve" is a curve in relation to which tooth models are immobilized. Preferably, the support curve follows the alignment of the tooth models and may be designated as "alignment curve". It preferably crosses the tooth models.

An observation of a model, under defined observation conditions, in particular in a defined direction of observation and at a defined distance, is called a "view".

A "front" view of a model of a dental arch is a view following a direction of observation perpendicular to the general plane of the vestibular faces of the modeled incisors. The other views (plan view, bottom view, right-hand view and left-hand view) are defined with respect to this front view.

The adjectives "upper", "lower", "horizontal" and "vertical" are with reference to a position in which the occlusion plane is horizontal, the patient's upper arch being above the lower arch.

A "view of an arch", "representation of an arch", "scan of an arch" or "model of an arch" signifies a view, a representation, a scan or a model of all or part of said dental arch.

A "neural network" or "artificial neural network" is a set of artificial intelligence algorithms well known to a person skilled in the art.

A representation, in particular a view of a model, is "hyper-realistic" when it appears to be a photo.

"Comprising" or "having" are to be interpreted non-restrictively, unless indicated otherwise.

An operation is performed "by computer" when it is carried out, in its entirety, by this computer. If an operator is needed to guide the computer in its work, this operation is carried out "by means of a computer" or "with a computer". Steps 1) to 7) are performed by means of a computer. One or more of steps 2) to 7) can be performed by computer.

BRIEF DESCRIPTION OF THE FIGURES

Other features and advantages of the invention will become clear from reading the following detailed description and by examining the appended drawing, in which:

FIG. 1 shows, diagrammatically, the different steps of a method according to the invention;

FIG. 2 shows an example of a perspective view of a model of a dental arch;

FIG. 3 shows an example of a front view of a model of a dental arch on which a tooth model has been delimited;

FIG. 4 shows an example of a plan view of a model of a dental arch in which the tooth models have been differentiated by gray shading and an initial support curve has been represented;

FIG. 5 shows a computer presenting, in its upper part, a front view of a jaw model of which the two arch models are deformed, with only the tooth models being shown, and, in its lower part, a front view of a jaw model of which the two arch models are deformed;

FIG. 6 shows a perspective view of a jaw model of which the two initial arch models are split, with only the tooth models being shown;

FIG. 7 shows the jaw model from FIG. 6 in the course of deformation;

FIG. 8 shows the jaw model from FIG. 6 at the end of deformation, in a front view; and FIG. 9 illustrates the steps implemented in an application in which an initial model of an arch (A) is developed (B)(C), a tooth is moved in the developed model (D), and the model thus modified is then straightened (E)(F).

DETAILED DESCRIPTION

As is shown in FIG. 1, a method according to the invention has steps 1) to 7).

In step 1), an initial model 10 of at least one arch of a patient, preferably of both arches of the patient (the initial model then constituting a jaw model), is prepared, preferably on the basis of measurements carried out on the patient's teeth or on an impression of his teeth, for example a plaster impression (FIGS. 2 and 6). The initial model is preferably created with a 3D scanner, preferably used to scan the patient's teeth directly.

In another embodiment, the initial model is theoretical, that is to say it does not correspond exactly to a real situation. In particular, the initial model can be created by assembling data of a set of tooth models chosen from a digital library.

The initial model can also be obtained by deformation of an original model. The original model can in particular be deformed in order to correspond to photos of the patient's arch, that is to say can be modified by "photo monitoring". The deformation can be determined, for example, in order to adapt the original model so that it correlates with photos of the patient's arches that were taken, for example by cell phone, during an orthodontic treatment. Preferably, the deformation comprises a movement of tooth models of the original model, without deformation of said tooth models.

The original model can be theoretical or, preferably, a scan of the arch, for example effected at the start of an orthodontic treatment.

Preferably, the initial model represents over 50%, preferably over 80%, preferably 100%, of the teeth of an arch, preferably of the teeth of both arches.

In step 2), the initial model 10 is split into tooth models 12 that each model a respective tooth (FIG. 3). The splitting of a model can be traditionally carried out manually with a computer. It can also be performed by computer, that is to say automated, for example by analysis of images, preferably by using a neural network.

Step 2) can be carried out by any conventional splitting method.

Preferably, in step 2), the initial model is split into two arch models that each model a respective arch of the patient. Following this splitting, the dental healthcare professional can advantageously modify the relative positions of the two arch models, for example in order to avoid overlapping between tooth models of the model of the upper arch and tooth models of the lower arch. This avoids a situation where some tooth models mask other tooth models.

In one embodiment, the movement of one arch with respect to the other is guided, for example in order to be limited to a vertical movement.

By observing the models of the upper and lower arches seen from above, an operator can immediately evaluate a possible overbite.

In step 3), at least one support curve, or "initial support curve", 14$i$ (FIGS. 4 and 6) is defined. This curve can be determined manually or automatically. It may or may not be represented on the initial model.

The initial support curve 14$i$ is a curve in relation to which, in the following step, the tooth models will be immobilized. Preferably, it extends along the arch, substantially following the successive teeth on this arch.

It can be theoretical and, for example, correspond to the general shape of an arch. It can in particular be chosen from a database containing typical support curves representing general shapes of different types of arch.

It can also be created by hand on a view of the initial model, for example by an operator, possibly by deformation of a typical support curve.

Preferably, the initial support curve is determined by means of a calculation algorithm, preferably as a function of dimensional characteristics of the arch. Algorithms for this purpose are known, in particular for producing panoramic images by tomography.

Preferably, the initial support curve extends in one plane, preferably in the median plane of the arch.

Preferably too, the initial support curve has the shape of a letter U or of a horseshoe.

In one embodiment, the initial support curve passes through the barycenters of the tooth models or is the projection, in a horizontal plane, preferably in the occlusion plane, of a curve passing through the barycenters of the tooth models. The initial support curve can also be a line passing through the points of the adjacent models that are closest, that is to say passing through the points of contact between the adjacent tooth models when they touch. The initial support curve can also be the projection, in a horizontal plane, preferably in the occlusion plane, of such a line.

The initial support curve has deformation properties which can preferably be determined in step 3). In particular, locally or along its entire length, it can
- be of constant length, that is to say does not vary when it is deformed, in step 5), and/or
- have a limited lengthening capacity, and/or
- be non-deformable in one or more directions.

In one embodiment, each portion of the initial support curve extending between two adjacent tooth models is of constant length.

In one embodiment, in particular when the length of the initial support curve is constant, the tooth models can interpenetrate or crush when they come into contact during the deformation of the initial support curve, in step 5). Advantageously, they do not therefore impede this deformation. The operator is thus able to deform the split model until a view is obtained that allows him to optimally analyze the spaces between the teeth along the initial support curve.

In one embodiment, the tooth models cannot interpenetrate during the deformation of the initial support curve, in step 5). Advantageously, the operator can thus deform the split model taking into account the real behavior of the teeth. The initial support curve can be of variable length, particularly in this embodiment.

In one embodiment, several initial support curves can be determined in step 3). In step 4), they can be fixed virtually to the same tooth models, to different tooth models, or in part fixed to the same tooth models and in part to different tooth models.

The different initial support curves can be of the same length or of different lengths.

In step 4), at least some of the tooth models, preferably all of the tooth models, are fixed virtually to the initial support curve. This "virtual" fixing denotes that, in the initial model, the tooth models and the initial support curve are assembled by computer in such a way as to form a monobloc assembly. In other words, a movement of a tooth model causes that of the initial support curve, and vice versa. In particular, a tooth model fixed to the initial support curve by a fixing point may not rotate around this fixing point. The virtual fixing does not compel the initial support curve to cross or even be in contact with the tooth models that are fixed there.

In step 5), the initial support curve is deformed (FIG. 7) until a first deformed model 10$d$ is obtained (FIG. 8).

Preferably, this deformation is carried out at constant length. In other words, the deformation of the initial support curve does not modify its length. When a segment of the initial support curve separates two tooth models, the length of this segment is therefore not modified during the deformation. If this length is representative, for example, of a diastema on the initial model, it can thus also be measured on the first deformed model.

The deformation of the initial support curve can consist of a modification of its opening (opening of the U or of the horseshoe), which makes it possible, for example, to simulate a modification of the arch length.

The deformation of the initial support curve can also consist of a "development" of this curve, that is to say an at least local increase of its radius of curvature. This development can in particular be effected until the initial support curve is rendered rectilinear (FIG. 8).

The "deformed support curve" 14*d* is the designation of the initial support curve after the latter has been deformed.

With the tooth models being fixed virtually to the initial support curve, their position and/or their orientation modify as the initial support curve is deformed. However, the movements of the tooth models do not modify the tooth models themselves. The tooth models in the first deformed model resulting from the deformation of the initial support curve are therefore the same as in the initial model.

When the initial support curve, extending initially in one plane, is deformed in such a way as to be made rectilinear, a first deformed model is thus obtained which, when it is observed from the front, provides a view similar to that of a panoramic image obtained by tomography. However, such a panoramic image does not represent the teeth with precision. Indeed, the processing that is carried out on the panoramic image leads to a representation of the teeth that does not correspond exactly to the teeth. By contrast, the first deformed model represents the tooth models with exactly the same dimensions as those of the tooth models of the initial model. If the initial model is a faithful representation of a dental arch of the patient, the first deformed model thus represents a dental arch "developed" without deformation of the teeth.

Furthermore, the first deformed model has the advantage of being able to be observed in any viewing direction.

The addition of several initial support curves at step 3) advantageously makes it possible to enforce the deformation at step 5), in particular if the initial support curves retain their lengths during this deformation.

If the initial support curves cross the tooth models and if the deformation of the initial support curves is carried out at a constant length of these curves, the distance between the points of contact of each curve with the adjacent tooth models is kept constant. Thus, two identical initial support curves, of constant lengths and fixed substantially one above the other to the same tooth models, limit the deformations of the initial model to deformations in a horizontal plane.

The length of an initial support curve can be variable during the deformation in step 5). For example, the deformation can be produced by a homothety whose center is, for example, the barycenter of the initial support curve.

The initial support curve can also be lengthened uniformly, which advantageously facilitates the measurements of the distances between adjacent tooth models.

In step 6), the first deformed model is presented to a dental healthcare professional, traditionally an orthodontist or a dentist. All means of presentation can be used. Traditionally, a view of the first deformed model 10*d* is displayed on a computer screen 16 (FIG. 5). Preferably, the dental healthcare professional possesses software allowing him to modify the displayed view, in particular the direction of viewing of the first deformed model or the scale of the displayed view.

The modification of the viewing direction makes it possible, for example, to observe the lingual aspects of the teeth, that is to say to have a point of view from inside the mouth.

The modification of the scale, that is to say of the magnification, makes it possible, for example, to observe in detail a specific region of the mouth.

The observation and, optionally, the measurements of the first deformed model advantageously allow the dental healthcare professional to evaluate the dental situation of the patient more easily and with greater precision.

For example, when the initial support curve has been rendered rectilinear, the dental healthcare professional can observe the first deformed model from the front and immediately assess the curve of Spee S of the dental arch (FIG. 5) or the lateral spacing between the adjacent teeth (diastema). The dental healthcare professional can also observe the first deformed model 10*d* from above and can compare the alignment of the teeth with respect to the deformed support curve 14*d* (FIG. 5), represented by a straight line. He can thus very easily assess indirectly the position of the teeth with respect to the initial support curve.

More generally, a plan view allows the dental healthcare professional to evaluate the spacing between the adjacent teeth, and in particular to evaluate whether this spacing is variable in a direction perpendicular to the deformed support curve.

Preferably, the dental healthcare professional takes measurements of the first deformed model. The measurements, preferably taken by means of the computer, also allow the dental healthcare professional to measure the dental situation objectively.

The measurements can in particular concern conventional dimensional indicators, and in particular the inter-canine distance and/or the inter-premolar width and/or the intermolar width and/or the length of the arch and/or the perimeter of the arch.

In one embodiment, the dental healthcare professional can also, by means of a computer, modify the position and/or the orientation of one or more tooth models, for example in order to simulate a future dental situation. Such a modification is in particular useful for determining a desired positioning of the teeth at a given step of an orthodontic treatment.

In step 7), optionally, the model from step 6) can be again deformed, in particular in order to realign the teeth according to the initial support curve, so as to obtain a second deformed model.

The method can thus be used to facilitate the modification of the initial model, by presenting the dental healthcare professional with a first model deformed by modification of the general alignment of the teeth, then, after he has modified the position and/or the orientation of one or more tooth models, giving him the possibility of again modifying the general alignment of the teeth in order to return to the initial support curve. FIG. 9 illustrates this application. Advantageously, the presentation of the first deformed model not only permits a more precise and more rapid evaluation of the dental situation but also facilitates the modification of the dental model.

The second deformed model can be used to plan an orthodontic treatment and/or to design and even manufacture an orthodontic appliance. In particular, if the tooth models in the second deformed model are aligned according to the initial support curve, a comparison of the initial model and of the second deformed model permits visualization of the modifications made in step 7).

In one embodiment in which, in step 6), the first deformed model has been modified in order to correspond to a target dental situation in which the models are positioned and oriented according to an arrangement desired at a given step of a dental treatment, in particular at the end of treatment, the second deformed model can be used to plan the treatment, and in particular at different steps of the treatment between the time at which the initial model was created and the time of treatment corresponding to the second deformed model.

In one embodiment, the initial model is simulated at different treatment steps and an animation is presented, preferably on a computer screen, in order to visualize dynamically the changes in the dental situation of the patient.

EXAMPLES OF USES

A method according to the invention can be used to find dimensional symptoms, that is to say symptoms that are detectable by analysis of dimensions of the arch, and in particular of distances between different teeth. A method according to the invention is especially useful in particular for evaluating a diastema situation or a malocclusion situation, especially a horizontal or vertical overbite.

In one embodiment, the initial model is colored in such a way as to be hyper-realistic, that is to say to have natural colors.

Preferably, the initial model is colored in accordance with colors found on the patient. A method according to the invention can thus be used to find color-related symptoms, that is to say symptoms that are detectable by analysis of the color of the surface of the arch, and in particular the color of the teeth. To this end, the initial model has to be colored, at least partially, in accordance with the real colors of the patient's arch.

The coloration of the initial model can be obtained by means of a scanner suitable for this purpose.

In a particularly advantageous embodiment, the coloration of the initial model is obtained using colors from one or more photos of the arch. More precisely, the coloration of the initial model is effected, at least in part, on the basis of at least one photo of the dental arch of the patient, by transferring the colors of pixels of said photo to corresponding voxels of the initial model.

Preferably, the coloration of the initial model has the following successive steps:
  a) identification of a view of the initial model having a maximum concordance with said photo;
  b) identification for a voxel, preferably for each voxel, represented on said view, of a corresponding pixel of said photo, that is to say a pixel that represents the same point of the dental arch as the voxel;
  c) allocation to said voxel of the colors of said pixel.

The concordance (match or fit) between two representations of an object is a measure of the difference, or "distance", between these two representations. Concordance is at its maximum (providing a best fit) when this difference is minimal.

In step a), one searches for the view of the initial model which has maximum concordance with the photo, that is to say which ideally represents substantially the same teeth in the same way. In other words, the representations of the teeth in the view and in the photo are substantially superimposable.

The search for the initial model having the maximum concordance with the photo can in particular be based on an optimization, preferably by means of a metaheuristic method, preferably by simulated annealing, and/or use of a deep learning device.

In step b), the points of the view that are represented by respective pixels on the photo are identified. In particular, when the photo was taken substantially at the same time that the initial model was created, the initial model represents the dental arch that was photographed.

The search for maximum concordance thus leads to a view that can be perfectly superimposed with the photo. Such superimposing permits identification of the points of the view, hence the voxels of the initial model, that are represented in the photo.

In step c), each voxel of the initial model represented by a pixel in the photo is assigned the color of this pixel.

On the basis of a photo, it is thus possible to color, with real colors, a part of the initial model.

Preferably, steps a) to c) are repeated with more than two photos, more than 10 photos, or even more than 100 photos, preferably taken substantially at the same time in different directions of viewing of the dental arch. It is thus possible to completely color the initial model.

With a colored initial model, a method according to the invention thus makes it possible, for example, to compare the colors of the two molars at the two ends of a dental arch, or to compare the color of a molar to the color of an incisor.

A method according to the invention is therefore eminently suitable for identifying a dental situation of molar incisor hypomineralization (MIH) in order to evaluate the efficacy of a tooth whitening treatment.

The photos can be replaced, at least partly, by hyper-realistic views of the initial reference model. Such hyper-realistic views can be obtained in particular by means of a neural network that is trained for this purpose, according to steps a') to c').

In step a'), a historical learning base is created which preferably comprises over 5,000 records, preferably over 10,000 records, preferably over 30,000 records, preferably over 50,000 records, preferably over 100,000 records.

Each record comprises a photo representing a "historical" dental arch, and a "historical" view of a "historical" three-dimensional digital model of the historical dental arch. The "historical" view represents the historical dental arch as the photo. In other words, the historical view has a maximum concordance with the photo, such that it can be substantially perfectly superimposed on the photo.

In step b'), the neural network is traditionally set up using the learning base.

To be operational, a neural network must in fact be trained by what is called a deep learning process.

The neural network can be chosen in particular from:
  the networks specialized in the localization and detection of objects in an image, the Object Detection Networks, for example:
    R-CNN (2013)
    SSD (Single Shot MultiBox Detector: Object Detection network), Faster R-CNN (Faster Region-based Convolutional Network method: Object Detection network)
    Faster R-CNN (2015)
    SSD (2015)
    RCF (Richer Convolutional Features for Edge Detection) (2017)
  the networks specialized in generation of images, for example:
    Cycle-Consistent Adversarial Networks (2017)
    Augmented CycleGAN (2018)
    Deep Photo Style Transfer (2017)
    FastPhotoStyle (2018)
    pix2pix (2017)
    Style-Based Generator Architecture for GANs (2018)
    SRGAN (2018).

The above list is not exhaustive.

By presenting the records at the input of the neural network, the latter learns progressively how to transform a view of a model presented to it into a hyper-realistic view.

The training can also be performed according to the teaching found in the article by Zhu, Jun-Yan, et al. "Unpaired image-to-image translation using cycle-consistent adversarial networks" (Open access Computer Vision Foundation).

In step c'), a view of the initial model can thus be submitted to the trained neural network, in such a way that the latter colors it in a hyper-realistic manner.

The hyper-realistic view can then be used as a photo for the implementation of steps a) to c). Of course, step a) is then simplified, since the hyper-realistic view that replaces the photo is derived from the view of the initial model. However, the colors of the hyper-realistic view supplied by the neural network are less specific to the patient than those of the colored view based on photos of the patient's arch.

As will now be clear, the invention makes available a novel tool for analyzing a dental situation. It thus facilitates diagnosis by the dental healthcare professional. This tool also makes it easier to take measurements and/or to design an orthodontic treatment plan and/or several orthodontic appliances, in particular orthodontic aligners.

A method according to the invention also advantageously makes it possible to observe simultaneously, on the first or the second deformed model, tooth models that would not be visible on the same photo.

A method according to the invention is in particular very different from the method described in US 2016/175068. Indeed, US 2016/175068 describes a method for determining the best group of dental arch models for an orthodontic treatment. US 2016/175068 thus teaches a method for determining the best path to modify the tooth arrangement in order to achieve an orthodontic goal. Therefore, such method is not a method for evaluating a dental situation of a patient but a method for determining an orthodontic treatment.

In addition, in US 2016/175068, the curve of the dental arch of the patient is modified by changing the arrangement of the tooth models. In other words, it is an action on the tooth models in order to reposition them that causes this modification. This modification is therefore not done by deforming an initial support curve, as according to the invention, but by moving tooth models to simulate an orthodontic treatment.

Finally, in US 2016/175068, the tooth models are repositioned to simulate the different stages of an orthodontic treatment. In particular, they are allowed to rotate around their contact point with the curve of the dental arch. They are therefore not fixed virtually to the initial support curve.

Of course, the invention is not limited to the embodiments described above and shown.

Finally, the patient is not limited to a human being. A method according to the invention can be used for another animal.

The invention claimed is:

1. Method for evaluating a dental situation of a patient, said method having the following successive steps:
   1) Generating an initial model of at least one dental arch of the patient;
   2) Splitting the initial model in order to define a tooth model for each of at least some of the teeth represented on the initial model and thereby to obtain a split model;
   3) Defining an initial support curve in the split model;
   4) Fixing each tooth model virtually to the initial support curve;
   5) Modifying the split model by deformation of the initial support curve, thereby modifying a position and/or an orientation of the tooth models without modifying the tooth models, until a deformed support curve is obtained, so as to obtain a first deformed model,
   wherein each model being a three-dimensional digital representation.

2. Method according to claim 1, in which, in step 1), the initial model is generated by means of a scanner.

3. Method according to claim 1, in which, in step 3), the tooth models are aligned according to the initial support curve.

4. Method according to claim 1, having a step 6), subsequent to step 5), in which
   the first deformed model is presented to an operator, and/or
   one or more measurements of size or appearance, in particular of color, are taken on the first deformed model, and/or
   the shape and/or the position of one or more tooth models of the first deformed model are modified, and/or,
   in step 2), the initial model is split in such a way as to define an upper arch model and a lower arch model, and, in step 6), the position of the upper arch model with respect to the lower arch model is modified.

5. Method according to claim 1, having a step 7), subsequent to step 5), in which
   A) the first deformed model is modified by deformation of the deformed support curve until a final support curve is obtained, so as to obtain a second deformed model.

6. Method according to claim 5, in which, in step A), the first deformed model is modified by deformation of the deformed support curve until a final support curve is obtained that is identical to the initial support curve.

7. Method according to claim 5, having, after step A), the following step B):
   B) an orthodontic appliance is designed and manufactured on the basis of the second deformed model.

8. Method according to claim 1, in which, in step 5), the initial support curve
   is non-deformable in one or more directions, and/or
   has a uniform lengthening or shortening capacity, or has a limited lengthening or shortening capacity.

9. Method according to claim 1, in which, in step 5) the initial support curve has a constant length.

10. Method according to claim 1, in which the tooth models are configured to freely permit the deformation in step 5).

11. Method according to claim 1,
    in which, before step 5), the initial model is colored, at least partially, using a color scanner in step 1) or
    having, before step 5), the following successive supplementary steps:
    a) identification of a view of the initial model having a maximum concordance with a photo of the arch;
    b) identification for a voxel, preferably for each voxel, represented on said view, of a pixel of said photo that represents the same point of the dental arch as the voxel;
    c) allocation to said voxel of the colors of said pixel, in such a way as to color, at least partially, the initial model.

12. Method according to claim 1, having, before step 5), the following successive supplementary steps:
    a) identification of a view of the initial model having a maximum concordance with a hyper-realistic view of the arch obtained by means of a neural network;

b) identification for a voxel, preferably for each voxel, represented on said view, of a pixel of said photo that represents the same point of the dental arch as the voxel;

c) allocation to said voxel of the colors of said pixel, in such a way as to color, at least partially, the initial model.

13. Method according to claim 12, in which said hyper-realistic view is obtained by the following successive steps:

a') creation of a learning base composed of over 1,000 records, each record having:
- a photo representing a "historical" dental arch, and
- a "historical" view of a three-dimensional digital model of said historical dental arch, the "historical" view representing the historical dental arch as the photo;

b') training a neural network by means of the learning base, such that it learns to color, in a hyper-realistic manner, a view of a model;

c') submission of said view of the initial model to the trained neural network, such that the latter colors it in a hyper-realistic manner.

14. Method according to claim 1, in which the deformed support curve is rectilinear.

15. Method according to claim 1, in which, in step 3), the initial support curve is determined as a function of dimensional characteristics of the arch.

16. Method according to claim 1, in which, in step 3), the initial support curve is determined in such a way as to cross at least two tooth models, preferably all the tooth models of the dental arch.

17. Method according to claim 1, in which, in step 3), several initial support curves are determined, in step 4), said initial support curves are fixed virtually to the same tooth models, to different tooth models, or in part to the same tooth models and in part to different tooth models, and, in step 5), the initial support curves are deformed without modifying their respective lengths.

18. Use of a method according to claim 1, for determining an orthodontic treatment, and/or for designing and manufacturing an orthodontic appliance, and/or for finding symptoms detectable by analysis of dimensions of the arch, and/or for finding symptoms detectable by analysis of the color of the surface of the arch.

19. Use of a method according to claim 18, for evaluating the efficacy of a tooth whitening treatment and/or evaluating a horizontal overbite or determining a class of occlusion and/or evaluating a right-left asymmetry of an arch and/or a difference in shape between the upper and lower arches and/or measuring or comparing the orientation of teeth and/or the distance between teeth and/or the overlapping of teeth.

* * * * *